(12) United States Patent
Mopur et al.

(10) Patent No.: US 12,307,739 B2
(45) Date of Patent: May 20, 2025

(54) IMAGE DATA SYNTHESIS USING ADVERSARIAL AUTOENCODERS FOR CONTINUAL TRAINING OF MODELS

(71) Applicant: HEWLETT PACKARD ENTERPRISE DEVELOPMENT LP, Houston, TX (US)

(72) Inventors: Satish Kumar Mopur, Bangalore (IN); Gunalan Perumal Vijayan, Bangalore (IN); Krishnaprasad Lingadahalli Shastry, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 497 days.

(21) Appl. No.: 17/683,816

(22) Filed: Mar. 1, 2022

(65) Prior Publication Data

US 2023/0281958 A1   Sep. 7, 2023

(51) Int. Cl.
*G06V 10/00* (2022.01)
*G06N 3/08* (2023.01)
(Continued)

(52) U.S. Cl.
CPC ............. *G06V 10/762* (2022.01); *G06N 3/08* (2013.01); *G06N 7/01* (2023.01); *G06V 10/82* (2022.01)

(58) Field of Classification Search
CPC .... G06V 10/762; G06V 10/82; G06V 10/774; G06N 3/08; G06N 3/0455; G06N 3/094;
(Continued)

(56) References Cited

U.S. PATENT DOCUMENTS 10,937,540 B2 *   3/2021   Madani ................. G06N 3/045
2019/0124045 A1   4/2019   Zong et al.
(Continued)

FOREIGN PATENT DOCUMENTS

CN   102930493 A  *  2/2013  ............... G06K 9/46
CN   112687369 A  *  4/2021
(Continued)

OTHER PUBLICATIONS

P. Pandey, P. A. P, V. Kyatham, D. Mishra and T. R. Dastidar, "Target-Independent Domain Adaptation for WBC Classification Using Generative Latent Search," in IEEE Transactions on Medical Imaging, vol. 39, No. 12, pp. 3979-3991, Dec. 2020, doi: 10.1109/TMI.2020.3009029. (Year: 2020).*

(Continued)

*Primary Examiner* — Vu Le
*Assistant Examiner* — Zaid Muhammad Saleh
(74) *Attorney, Agent, or Firm* — Sheppard Mullin Richter & Hampton LLP

(57) ABSTRACT

Systems and methods are provided for retraining machine learning (ML) models. Examples may automatically identify skewed, anomalous, and/or drift occurrence data in real-world input data. By automatically identifying such data, examples can reduce subjectivity in ML model retraining as well as reduce time spent determining a need to retrain a ML model. Accordingly, a determination can be made objectively by a computing system or device according to computer-implemented instructions. Additionally, examples may automatically isolate and transfer data relevant to the retraining of a ML model to a training environment for retraining the ML model using real-world input data. Examples also synthesize large samples of data for use in retraining a ML model. The synthesized data may be generated based on the (Continued)

isolated and transferred data and can be used in place of actual real-world input data to reduce a corresponding delay.

20 Claims, 10 Drawing Sheets

(51) Int. Cl.
  *G06N 7/01* (2023.01)
  *G06V 10/762* (2022.01)
  *G06V 10/82* (2022.01)
(58) Field of Classification Search
  CPC ........ G06N 3/0475; G06N 3/088; G06T 5/50; G06T 7/0012; G06T 2207/20221
  See application file for complete search history.

(56) References Cited

U.S. PATENT DOCUMENTS

| | | |
|---|---|---|
| 2019/0287230 A1 | 9/2019 | Lu et al. |
| 2020/0082916 A1 | 3/2020 | Polykovskiy et al. |
| 2020/0163641 A1* | 5/2020 | Amit .................... A61B 6/502 |
| 2020/0176121 A1 | 6/2020 | Dalal et al. |
| 2020/0183032 A1 | 6/2020 | Liu et al. |
| 2020/0226475 A1 | 7/2020 | Ma et al. |
| 2020/0320402 A1 | 10/2020 | Yoon et al. |
| 2021/0125104 A1 | 4/2021 | Christiansen et al. |
| 2021/0133539 A1 | 5/2021 | Srivastava et al. |

FOREIGN PATENT DOCUMENTS

| | | | | |
|---|---|---|---|---|
| CN | 112866668 A | * | 5/2021 | ........... H04N 13/106 |
| EP | 3477553 A1 | * | 5/2019 | ........... G06K 9/6256 |
| KR | 2021040546 A | * | 4/2021 | ............... G06N 3/08 |
| KR | 2021141060 A | * | 11/2021 | |
| WO | WO-2018192672 A1 | * | 10/2018 | ......... G06F 18/2433 |
| WO | WO-2021046300 A1 | * | 3/2021 | ........... G06F 11/3688 |

OTHER PUBLICATIONS

Kohlberger, T. et al., "Generating Diverse Synthetic Medical Image Data for Training Machine Learning Models," Feb. 19, 2020, Google Health, 8 pages, https://ai.googleblog.com/2020/02/generating-diverse-synthetic-medical.html.

Makhzani, A. et al., "Adversarial Autoencoders," Nov. 18, 2015, arXiv preprint arXiv: 1511.05644, 16 pages, https://arxiv.org/pdf/1511.05644.pdf.

Seldon Technologies Ltd., "Adversarial AE Detection and Correction on CIFAR-10," 2019, https://docs.seldon.io/projects/alibi-detect/en/latest/examples/ad_ae_cifar10.html.

Simidjievski, N. et al., "Variational Autoencoders for Cancer Data Integration: Design Principles and Computational Practice," Dec. 11, 2019, Frontiers in Genetics, vol. 10, Article 1205, 14 pages, https://www.frontiersin.org/articles/10.3389/fgene.2.

\* cited by examiner

IMAGE DATA SYNTHESIS USING ADVERSARIAL AUTOENCODERS FOR CONTINUAL TRAINING OF MODELS

BACKGROUND

Data systems, platforms, and frameworks can apply machine learning (ML) or other models or algorithms (referred to herein as "ML models") on data inputs to generate various analytics. Often, these ML models may be trained to generate outputs based on inputs received during operation (i.e. when the ML model is placed in a production/inference environment). Training of ML models may involve providing ML models with known training data which produce known outputs. Such training can teach the ML models what outputs to predict based on particular inputs. For ML models to have accurate performance, training data and operational data (i.e. real-world data) may share various features used to predict corresponding outputs (as used herein a data feature may refer to a distinctive attribute or characteristic of the data).

BRIEF DESCRIPTION OF THE DRAWINGS

The present disclosure, in accordance with one or more various examples, is described in detail with reference to the following figures. The figures are provided for purposes of illustration only and merely depict typical or examples.

Figure 1:
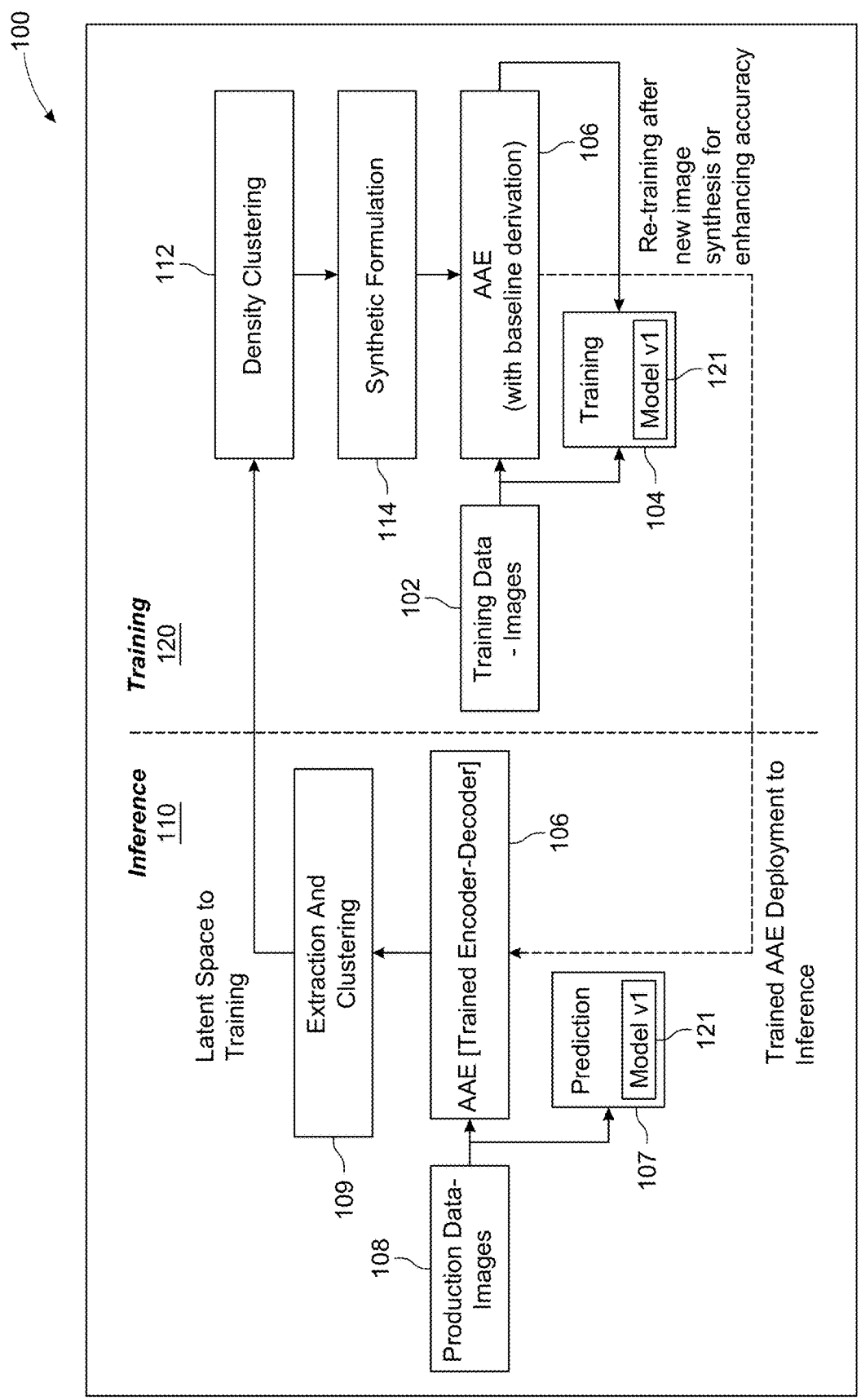
FIG. 1 is an example functional flow diagram illustrating inference and training environments that implement various aspects, such as continual ML model retraining, according to examples described in the present disclosure.

The figures are not exhaustive and do not limit the present disclosure to the precise form disclosed.

DETAILED DESCRIPTION

In Artificial Intelligence (AI) and other data analytics and processing environments, a user may employ one or more machine learning (ML) techniques such as classification, regression, clustering, and so forth. The user may build an ML model to generate analytics (such as output predictions) while operating in an inference environment (as used herein, an inference environment may refer to an environment where an ML model receives real-world input data). Building the ML model may include training the ML model with labeled data to perform desired analytics, such as generating an output data based on real-world input data. Training the ML model may involve teaching the ML model how to generate the desired analytics based on the real-world input data.

During operation of the trained ML model, such as in the inference environment, real-world input data may be presented to the ML model, and the ML model may generate output predictions based on its training. Where real-world input data is similar to the ML model's training data, ML model accuracy, performance, etc. (referred to herein collectively as "performance) may be maintained. However, if the real-world input data shifts or changes so that the training data used to train the ML model no longer represents a distribution of the real-world input data, then the accuracy and performance of the ML model may degrade. This performance degradation may limit the utility of the ML model for generating predictions based on such real world input data.

AI and ML models (collectively referred to herein as "ML models") can be used to diagnose various conditions in healthcare environments, such as diagnosing diabetic retinopathy grading, chest diseases, cancer detection, and so forth. In many such instances of ML model use, users train ML models using historically-labelled data and test the ML models using similar real-world input data (which the ML models have not been trained on). These ML models perform well when the real-world input data is similar to the historically-labeled training data. In some examples of healthcare environments, the historically-labeled training data may comprise known disease data. When the real-world input data comprises known disease data, the ML model may perform well. However, when the real-world input data comprises unknown disease data, performance of the ML model may be negatively impacted because the real-world input data differs from the historically-labelled training data. In some examples, such changes may correspond to disease data changes over time, such as where the real-world input data corresponds to new and/or rare disease occurrences, restricted data due to privacy concerns, and so forth.

In some examples, the difference between real-world input data and training data may correspond to or be represented by one or more discrepancies, such as training-production data skew, data collection and/or processing anomalies, data drift, and so forth. To compensate for discrepancies between real-world input data and training data, image synthesis and data augmentation tools can be used to retrain an ML model. However, such tools are generally disadvantageously manual/iterative and potentially introduce subjectivity into ML model training and operation (for example, such tools often fail to consider production data dynamics, such as when data drift occurs). Such disadvantages can result in improper or delayed training of ML models and can lead to erroneous predictions at inference.

In the healthcare environments described above, the aforementioned disadvantages can result in untimely and inaccurate diagnostic actions. For example, manual identification of a need to retrain an ML model along with subsequent iterative retraining of the ML model can cause significant delays in retraining. During such delays, the ML model may provide deficient predictions. Furthermore, the retraining may be subjective based on how the need to retrain the ML model is determined. For example, a first user may review training data and real-world input data and determine that any drift or difference is minimal, and thus determine that no retraining is needed. However, a second user may review the same training and real-world input data and determine that retraining is needed. Accordingly, such manual analyses may introduce subjectivity.

The systems and methods disclosed herein may improve upon retraining of ML models. As a first point, the disclosed technology may automatically identify skewed, anomalous, and/or drift occurrence data in real-world input data. This skewed, anomalous, and/or drift occurrence data may correspond to changes and/or differences between the training data and real-world input data. By automatically identifying such data, the disclosed technology reduces subjectivity in ML model retraining as well as improves (i.e., reduces) time spent determining a need to retrain a ML model. For example, a determination can be made objectively by a computing system or device according to computer-implemented instructions. As a further improvement, the disclosed technology may automatically isolate data relevant to ML model retraining. Accordingly, only this relevant data may be transferred to a training environment for retraining the ML model from real-world input data. Where an ML model is applied to voluminous quantities of ever changing data, identifying data needed to retrain the ML model, such as data that has changed between training data and real-world input data, is itself a resource intensive process. To address this problem, the disclosed technology synthesizes large samples of data for use in retraining an ML model (as used herein synthesized/synthetic data may refer to data which has been generated based on other data; in other words synthesized/synthetic data may refer to data which is not obtained from direct measurement). The synthesized data may be generated based on the isolated and transferred data and can be used in place of actual real-world input data to reduce a corresponding delay. Thus, the disclosed technology provides numerous benefits by enabling prompt and continuous ML model retraining to maintain accuracy and performance of ML models as the real-world input data changes over time.

In some examples, the disclosed technology employs an Adversarial Autoencoder (AAE) to identify when to retrain an ML model (as used herein an AAE may refer to an autoencoder that employs a generative adversarial network to perform tasks such as variational inferencing). In certain examples, the AAE may use synthetic training data generated based on data extracted from real-world input data to identify when to retrain the ML model. This AAE may be trained using the same training data used to train the ML model. Once trained, the AAE may be deployed at inference and applied to the same real-world input data as the ML model (in various examples, only the encoder-decoder portion of the AAE will be deployed at inference—accordingly, in these examples the term "AAE" may refer to just the encoder-decoder portion of the AAE when deployed at inference). By training the AAE and the ML model with the same training data and applying the trained AAE and the trained ML model to the same real-world input data, the AAE can identify when the real-world input data adapts or changes to be sufficiently different from the training data that retraining of the ML model is warranted. In some examples, the AAE generates a latent space based on the real-world image input data and generates clusters in the latent space (as used herein a latent space may refer to a representation of data such as a multidimensional space containing data feature values). The clusters may correspond to data that the AAE is trained to identify as well as data that corresponds to one or more data differences (e.g. skew, anomalies, drift, etc.). One or more clusters corresponding to the skew, anomalies, or drift of the real-world input data as compared to the training data may be conveyed to the training environment for data synthesis and retraining of the ML model. The data synthesis may synthesize training data to retrain the ML model based on the one or more clusters of the skew, anomalies, and/or drift, thereby improving ML model performance and accuracy even in the face of changing real-world input data.

Further details of the disclosed technology are provided below with reference to FIGS. 1-9.

FIG. 1 depicts an example functional flow diagram 100 of example inference and training environments 110, 120 that implement various aspects, such as continual ML model retraining, according to examples described in the present disclosure. Inference environment 110 and training environment 120 include data flows for training and operation of ML model 121 and AAE 106. Specifically, blocks disposed within inference environment 110 relate generally to data flow during operation of ML model 121 and AAE 106. Blocks disposed within training environment 120 relate generally to data flow during training of ML model 121 and AAE 106.

In training environment 120, a user may build and train ML model 121 using training data 102. ML model 121's type may be determined based on the whether the user is performing classification, regression, and/or clustering analysis with ML model 121. In instances where the user is performing image analysis, such as image classification in healthcare environments, training data 102 may comprise labeled image data. ML model 121 can be trained, at training 104 using training data 102, to generate output predictions based on input data. The trained ML model 121 can then be applied in inference environment 110 to predict outputs based on real-world input data, described further below.

In some examples, the labeled training data 102 can also be used to train AAE 106 in training environment 120. Training AAE 106 with training data 102 may teach AAE 106 to identify whether real-world input data, such as input images, deviates or is different from a trained baseline generated based on training data 102. Further details are provided below with reference to FIG. 2.

Once ML model 121 and AAE 106 are trained with training data 102, both ML model 121 and AAE 106 can process real-world input data, such as production data 108, in inference environment 110. Specifically, ML model 121 can process production data 108 to predict outcomes at prediction 107. When processed by AAE 106, production data 108 may be compared to the baseline generated during training of AAE 106 to identify whether production data 108 is different from training data 102 and whether ML model 121 needs to be retrained to maintain performance. Specifically, AAE 106 can identify whether production data 108 comprises sufficient or threshold amounts of data skew, anomalies, and/or drift (referred to collectively herein as "data changes") with respect to training data 102, to require retraining ML model 121.

Based on processing by AAE 106, a latent space of features of production data 108 can be extracted and clustered at extraction and clustering 109. In some examples, such latent space extraction and clustering can be performed by one or more of a controller that applies ML model 121 and AAE 106, and so forth. Such latent space extraction and clustering can be analyzed and processed to identify any data changes between production data 108 and training data 102, as described further below with respect to FIG. 3.

In some examples, clusters associated with any identified data changes may be conveyed to training environment 120 for density analysis, such as at density clustering 112. Density clustering 112 may comprise identifying densities of those clusters of the identified data changes. For example, certain differences between training data 102 and production data 108 may be low in density, suggesting that the number of such differences are small or below a threshold value. For such low density differences, ML model 121 may not be retrained because the low density of differences may not correspond to substantial changes or a direction of changes in production data 108. However, if the density of certain changes identified by the clusters surpasses a threshold value, then ML model 121 may be retrained to enable ML model 121 to appropriately generate predictions based on the real-world input data.

At synthetic formulation 114, synthesized training data can be generated or formulated to enable retraining of ML model 121. As described above, synthesized/synthetic data may refer to data which has been generated based on other data. In other words synthesized/synthetic data may refer to data which is not obtained from direct measurement. The synthesized training data may be generated based on data change clusters having density values that surpass threshold value(s). The synthesized training data may be generated to ensure that there are sufficient training data to retrain ML model 121. Accordingly, training environment 120 may generate the synthesized training data where production data 108 does not include a large enough subset of data to adequately retrain ML model 121. Once the synthesized training data is generated, the ML model 121 can be retrained, as shown in FIG. 1. Further details regarding training and inference environments 120 and 110, respectively, are provided below.

Figure 2:
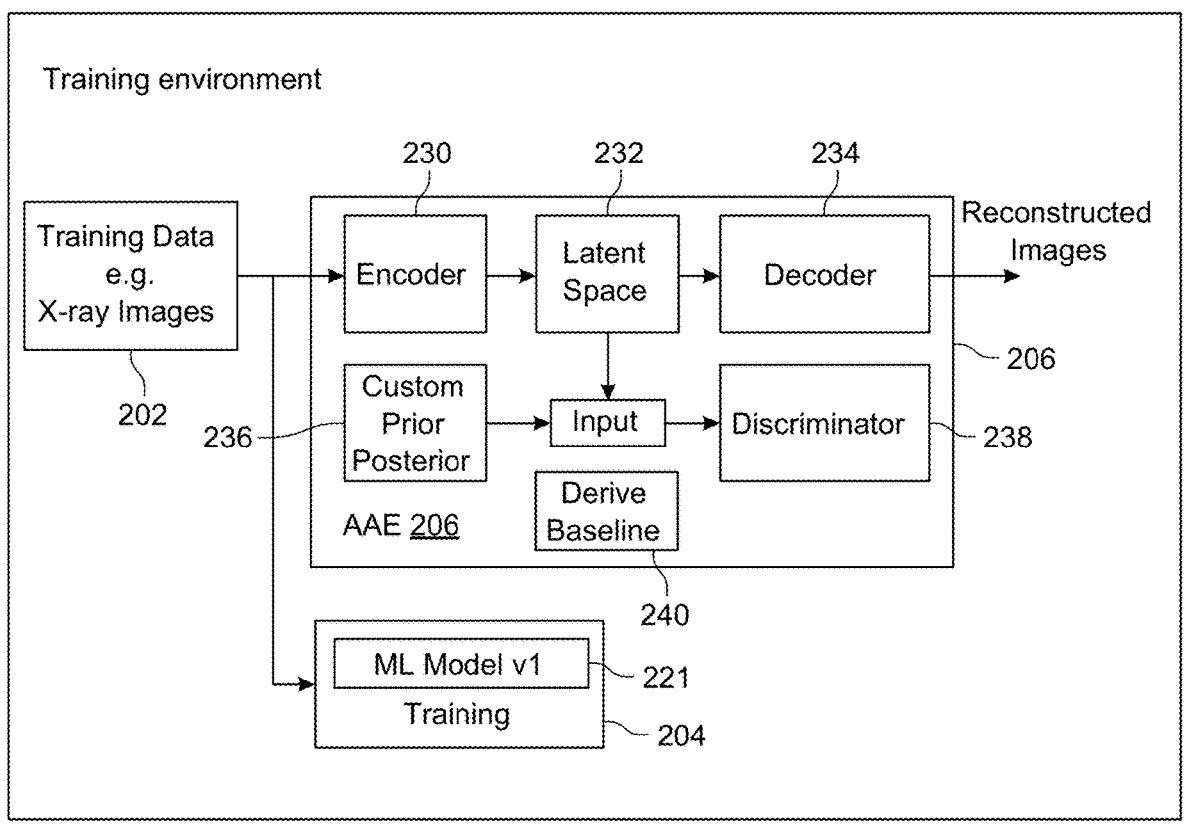
FIG. 2 is a functional flow diagram illustrating training of an Adversarial Autoencoder (AAE) and ML model with training data in a training environment, according to examples described in the present disclosure.

FIG. 2 is a functional flow diagram 200 which illustrates training of AAE 206 and ML model 221 with training data 202 in training environment 220, according to examples described in the present disclosure. Training environment 220 may correspond to training environment 120 of FIG. 1, ML model 221 may correspond to ML model 121, AAE 206 may correspond to AAE 106, and training data 202 may correspond to training data 102.

As shown in FIG. 2, training data 202 is used to train AAE 206 and ML model 221 at training 204. AAE 206 may comprise (1) an encoder network comprising an encoder 230, a latent space 232, a decoder 234, and (2) a discriminator network comprising a custom prior posterior and a discriminator. The encoder network may be trained for reconstruction, while the discriminator network may be trained for regularization. During the training shown, AAE 206 may be trained to generate a baseline 240 of features of training data 202.

Encoder 230 may generate latent space 232 based on processing input training data 202. More specifically, encoder 230 may compress input training data 202, such as input images, into latent space 232, such that latent space 232 comprises a compressed representation of the input training data 202. Decoder 234 of AAE 206 may generate a reconstructed output (not shown in this figure) based on latent space 232, such that decoder 234 generates a reconstruction of input training data 202 during training of AAE 206. In some examples, the reconstructed output generated by decoder 234 may be of lower quality than input training data 202. This may be a consequence of compressing input training data 202 to create latent space 232. Where input training data 202 comprises input images, decoder 234 may generate reconstructed images based on the compressed representations of latent space 232. A comparison of the reconstructed output generated by decoder 234 with input training data 202 can be used to determine when AAE 206 is trained. For example, when properly trained, encoder 230 of AAE 206 will compress input training data 202 to generate latent space 232 and decoder 234 will generate the reconstructed output based on latent space 232 such that a small number of errors exists between input training data 202 and the reconstructed output. For example, when input training data 202 comprises images and AAE 206 is appropriately trained, the reconstructed images generated by decoder 234 may have below a threshold number of errors or be below a threshold reduced quality level as compared to the input image of input training data 202. As such, the encoder network may be trained for reconstruction.

In some examples, AAE 206 may employ a generative adversarial network (GAN) to perform variational inferencing. Such variational inferencing may be a method of approximating a posterior distribution. Specifically, the GAN may match an aggregated posterior of latent space 232 generated based on training data 202 by AAE 206 with an arbitrary prior distribution. In some examples, the training of AAE 206 may employ a Gaussian Prior Posterior as custom prior posterior 236 as an initial seed (though a custom prior posterior may also be used as the initial seed). During regularization of the discriminator network, discriminator 238 may be trained to distinguish between latent space inputs coming from the encoder network and those coming from custom prior posterior 236. As such, the GAN of AAE 206 can generate baseline data 240. Baseline data 240 may comprise a stabilized error (i.e., loss) value after training of AAE 206. In other words, an amount of data loss by AAE 206 may plateaus as AAE 206 approaches a trained state. In some examples, a loss of AAE 206 may comprise a compression loss of encoder 230, a reconstruction loss of decoder 234, and a loss introduced by the discriminator network. As discussed in further detail below, baseline data 240 can be used as a reference for identifying changes between input training data 202 and production data (not pictured) when AAE 206 and ML model 221 are operating in the inference environment, such as inference environment 110.

In some examples, AAE 206 enables the image data synthesis described herein because AAE 206 presents a smooth latent space and reconstructs images with reduced blur in an inference environment (such as inference environment 110). Additionally, AAE 206 may flexibly impose desired distributions over generated latent space 232 based on the real-world input data in the inference environment. AAE 206 may also be agnostic of distributions for sampling during training.

As introduced above, once AAE 206 is trained, AAE 206 can be employed in an inference environment to identify skew, anomalies, and drift in the input real-world data with respect to the training data 202. Such identification of differences may enable the automatic and continual retraining of ML model 221 using dynamically synthesized data. Such retraining may improve ML model accuracy and performance on a consistent and continuous basis.

Figure 3:
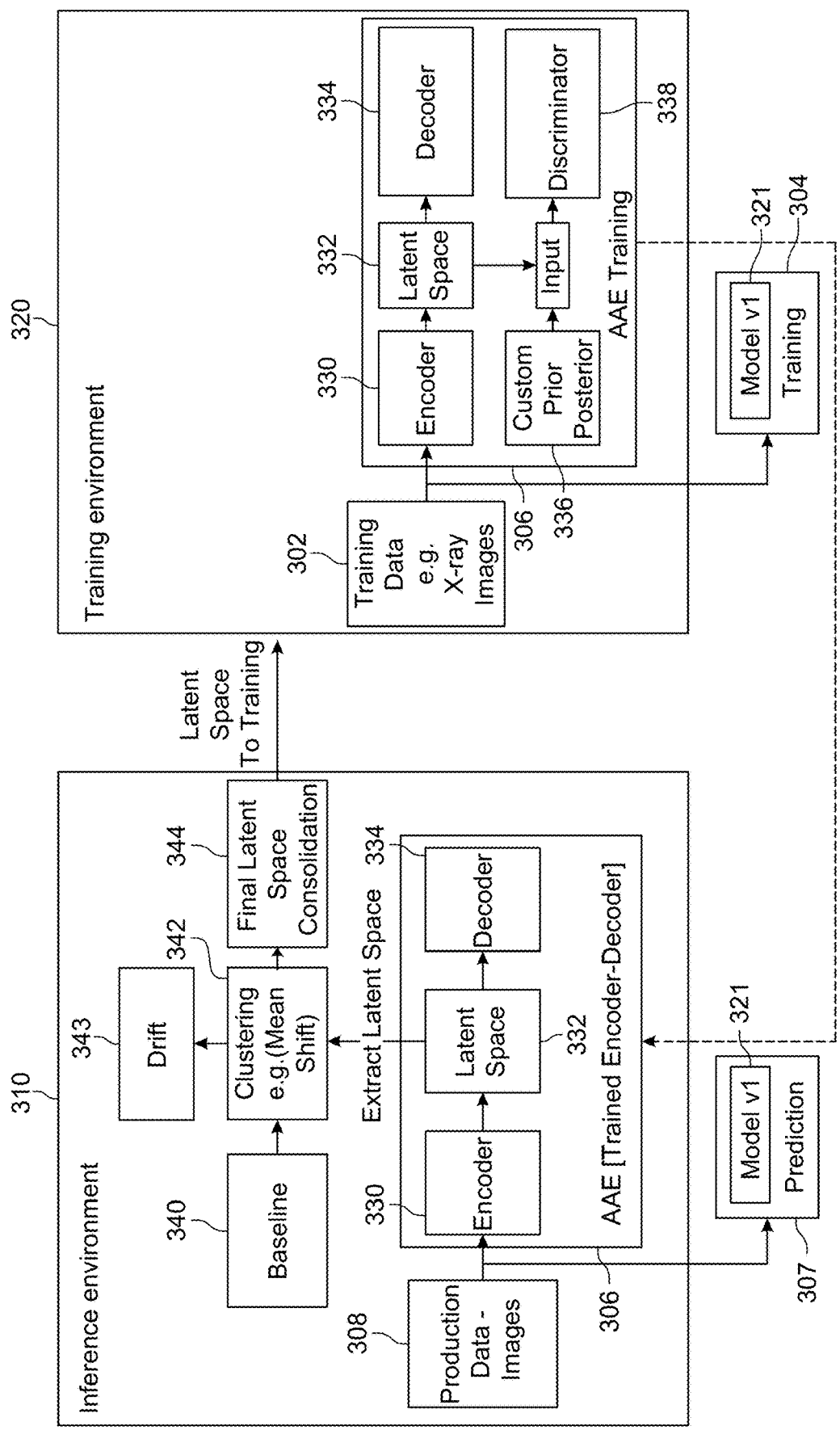
FIG. 3 is a functional flow diagram illustrating an AAE being trained in a training environment and applied in an inference environment, according to examples described in the present disclosure.

FIG. 3 is a functional flow diagram 300 illustrating an example of AAE 306 (which may correspond to AAE 206), being trained in training environment 320 and applied in an inference environment 310, according to examples described in the present disclosure. The trained AAE 306 may detect differences between input production data 308 and training data 302. Based on these differences, final latent space 344 corresponding to the detected data changes or differences between training data 302 and production data 308 can be generated and provided to training environment 320 for retraining of ML model 321, as described further below. Components of FIG. 3 having reference numbers corresponding to component reference numbers of components introduced and described above with respect to FIGS. 1-2 may have similar functionality and aspects, which will not be described again here in the interest of brevity.

More specifically, FIG. 3 shows how AAE 306 (trained in training environment 320) may be applied in inference environment 310 to process production data 308. Training environment 320 may correspond to training environment 120, while inference environment 310 may correspond to inference environment 110. AAE 306 is shown trained using training data 302 as described with respect to FIG. 2 to generate a baseline. The trained AAE 306 is then used in inference environment 310, where it receives and processes input production data 308 and compares input production data 308 to the baseline. In some examples, AAE 306 receives input production data 308 in batches, where a size of the batches is tunable by a user of, for example, AAE 306.

When processing input production data 308, AAE 306 may use encoder 330 to generate latent space 332 based on input production data 308, whether received in batches or not. The generated latent space 332 can be analyzed using clustering 342, by which latent space 332 is analyzed to identify clusters of input production data 308 that correspond to particular recognized data. For example, when input production data 308 correspond to images, latent space 332 may provide a compressed representation of the images, and the clustering may cluster or group images into groups of similar images (e.g., image content, etc.). The clustering at 342 may use a Mean Shift or similar algorithm to generate a cluster set, such as cluster set C, which can comprise a number of clusters {C1, C2, . . . , Ci, . . . , Cn} for the different types of data in input production data 308. Clustering at 342 may be non-parametric without assuming any particular distribution on the data. In clustering, different features of the latent space 332 can be grouped into corresponding clusters. The clusters of features, thus, correspond to features of input production data 308.

This clustering at 342 may generate clusters for features identified in training data (i.e., baseline features) as well as features corresponding to or representing one or more of data changes, such as drift 343. Such data change clusters may have low density or be far in distance from clusters generated based on the baseline features. Thus, such clustering may employ baseline 340 to identify when data in latent space 332 of input production data 308 differs from baseline 340. More specifically, a comparison of baseline 340 with the clusters generated at 342 based on latent space 332 of production data 308 may result in identification of aspects of latent space 332 that do not overlap with baseline 340. This extracted final latent space 344 may correspond to a portion of latent space 332 that is associated with the clusters based on data changes (e.g., skew, anomalous, and/or drift data) of production data 308. The final latent space extraction functionality may extract these clusters and tag and record the same. Final latent space 344 comprising these extracted clusters 342 may be communicated to training environment 320 for the retraining of ML model 321, described below in further detail.

In some examples, different changes in input production data 308 may result in different cluster sets generated by clustering 342. For example, clusters generated from the input production data 308 that experience or represent data drift over time may result in different clusters (and different cluster densities) as compared to the clusters (and cluster densities) generated based on input production data 308 that experience skew and/or anomalies. Thus, final latent space 344 may be different for different batches of production data 308.

In some examples, though not explicitly shown in FIG. 3, losses and images corresponding to the original input production data 308 can be extracted by decoder 334 of AAE 306 with timestamps. The reconstructed images and corresponding data can be optionally communicated to training environment 320 for reference purposes by a user during re-training, as appropriate.

Figure 4:
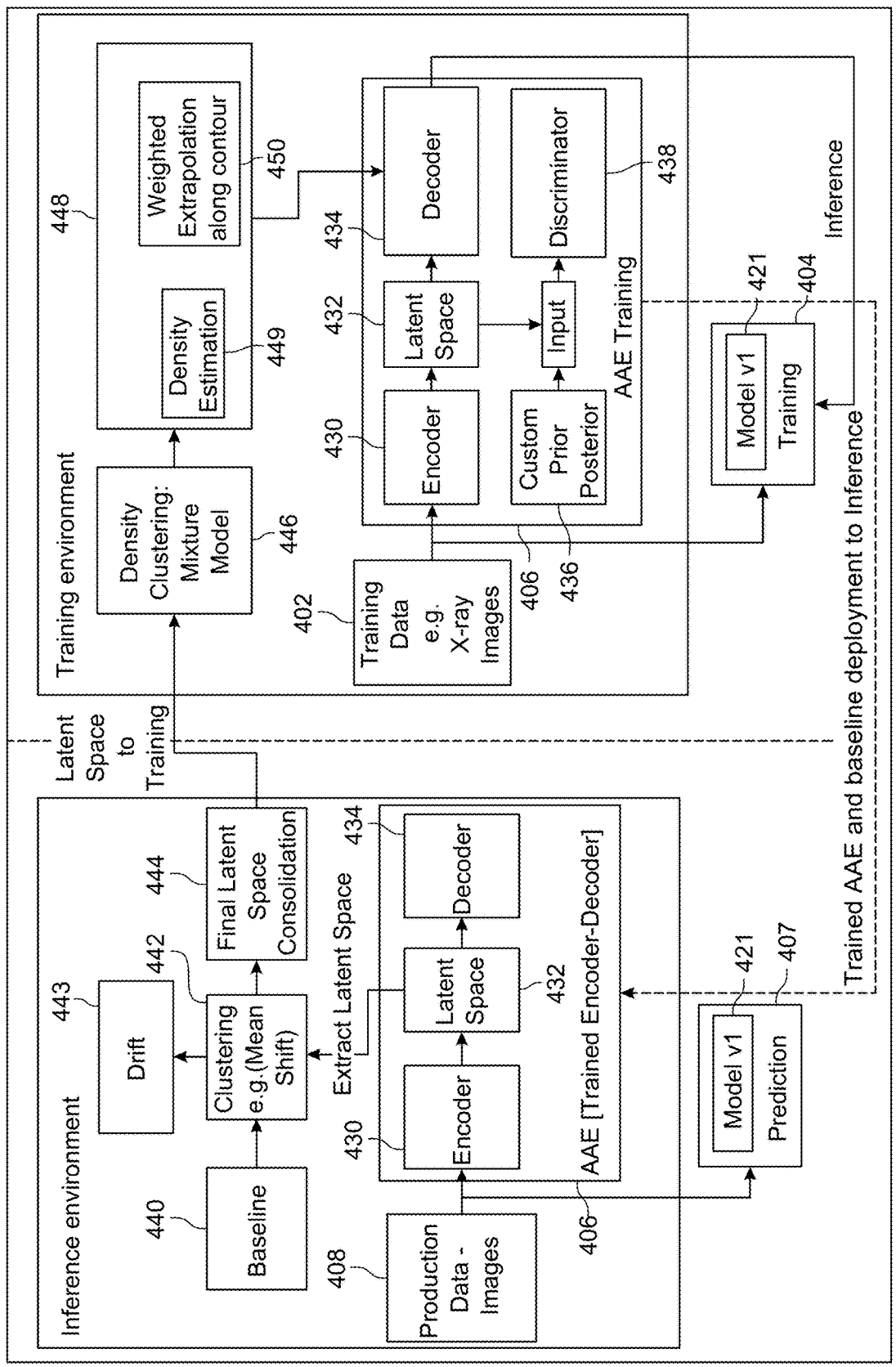
FIG. 4 is a functional flow diagram illustrating the use of a trained AAE in inference and training environments to determine when to retrain an ML model and generate synthetic data for retraining the ML model, according to examples described in the present disclosure.

FIG. 4 is a functional flow diagram 400 illustrating the use of trained AAE 406 (which may correspond to the AAE 306) in inference and training environments 420, 410, respectively, to (1) determine when to retrain ML model 421 and (2) generate synthetic data for retraining ML model 421, according to examples described in the present disclosure. As will be described below, examples may determine to train ML model 421 by detecting scenarios such as skew or drift. Components of FIG. 4 having reference numbers corresponding to component reference numbers of components introduced and described above with respect to FIGS. 1-3 may have similar functionality and aspects, which will not be described again here in the interest of brevity.

FIG. 4 shows how training environment 420 may use a final latent space 444 to generate the synthetic data that is used to retrain ML model 421. Final latent space 444 (which may be received from inference environment 410) can be processed by a density clustering mixture model 446. Density clustering mixture model 446 may apply one or more models or modeling algorithms to determine a density of one or more clusters of production data 408. In some examples, density clustering mixture model 446 may comprise a Gaussian mixture model. More specifically, density clustering mixture model 446 may identify or create clusters in final latent space 444 that only correspond to changed data from production data 408 (i.e. changed from training data 402). The changed data identified in production data 408 may correspond to features of production data 408 for which ML model 421 has not been trained, such as new features that are starting to appear in production data 408. This technique allows generation of clusters having arbitrary shapes or including arbitrary quantities that can be representative of changed data scenarios, where the different scenarios (skew vs. anomalies vs. drift, etc.) are separated as different clusters with corresponding density values, described further below.

Once the clusters corresponding to the new features of the changed data are recreated, the recreated clusters may be processed by a synthetic latent space generation process 448. Synthetic latent space generation process 448 may use the recreated clusters to create synthetic data corresponding to the changed data, such as each of the changed data of the new features of production data 408. This synthetic data can then be used to retrain ML model 421 so that the retrained ML model 421 is able to perform predictions based on production data 408 even as production data 408 changes (for example, as one or more of the previous skew, anomalous, and/or drift data appear in production data 408). By continuously enabling this detection of changes in production data 408 and retraining ML model 421 using synthetic data, ML model 421 can adapt as production data 408 adapts. This helps maintain the performance of ML model 421 with respect to accuracy and other metrics.

Synthetic latent space generation process 448 may comprise a density estimator 449 that performs, for example, density estimation of recreated clusters. Synthetic latent space generation process 448 may also comprise a data extrapolator 450 that performs, for example, weighted extrapolation along a contour. Density estimator 449 may identify densities of the recreated clusters corresponding to the changed data differences identified in production data 408. In some examples, density estimator 449 may comprise a kernel density estimator. In certain examples, densities may correspond to a number of each type of changed data (e.g., skew, anomalous, drift, and/or other different data) that is identified in a batch of production data 408 received and processed by the trained AAE 406. For example, when a batch of production data 408 includes more skew data than other types of data differences, the densities estimated by density estimator 449 should indicate a higher density of skew data clusters as compared to other types of data differences. When a batch of production data 408 includes more drift data than other types of data differences, the densities estimated by density estimator 449 should indicate a higher density of drift data clusters as compared to other types of data differences, and so forth.

Based on these estimated densities, a new latent space can be formulated based on extrapolation of the clustered data from density clustering mixture model 446. For example, synthetic latent space generator 448 may determine which data to be used to create the synthetic data to retrain ML model 421. More specifically, data extrapolator 450 may apply a model or other algorithm, such as weighted extrapolation, to identify which clusters (and thus, which corresponding data) should be used as a basis for creating the synthetic data. When data extrapolator 450 performs the weighted extrapolation along a contour, data extrapolator 450 may identify which cluster(s) have greatest density(ies) based on density count. In some examples, data extrapolator 450 can be configured, for example, by a user to identify a threshold number of densities or clusters based on curve analysis. In certain examples, data extrapolator 450 can be configured to identify a threshold amount of curve to use to create the synthetic data regardless of the number of corresponding clusters or densities that threshold amount of curve corresponds to. Synthetic latent space generation process 448 may then pass the data of the final latent space corresponding to the extrapolated densities or clusters to decoder 434 of AAE 406 to create the synthetic data corresponding to the changed data (e.g., the skew, anomalous, drift, and/or other different data) of production data 408 identified by AAE 406 that has the most density(ies).

In one example, synthetic latent space generation process 448 may order cluster densities, as identified by density estimator 449, from a maximum density to a minimum density. Latent space 432 may include data for a number of anomaly clusters (e.g., Ca1-Can) and a number of drift clusters (e.g., Cd1-Cdm) having cluster densities (e.g., Da1-Dan and Dd1-Ddm, respectively), and so forth. The densities may be ordered from a maximum density to a minimum density for all recreated clusters (e.g., [Ddn, Da1, Dan, ... ], where Ddn is the maximum density, Da1 is the next largest density, Dan has a density that is smaller than both Ddn and Da1 and larger than other densities, and so forth). A weight extrapolator (not pictured) may then apply one or more weights, $W_i$, to each density (e.g., each of Da1-Dan, Dd1-Ddm, and so forth) in direct proportion to a density count across all densities (for example, from n to 1).

Data extrapolator 450 may then extract contours of density space distributions generated by the density estimator. For each extracted contour, data extrapolator 450 may further extrapolate values along the contour in each density space multiplied by the associated weight. For example, perform $W_i$*PointsInCluster $C_i$ away from the baseline.

Synthetic latent space generation process 448 may then record the extrapolated information as an augmented new latent space, which can be then fed to decoder 434 of AAE 406. Decoder 434 may then generate reconstructed data corresponding to the augmented new latent space. The reconstructed data may be effectively synthesized based on the extrapolation processes described above. These synthesized data can then be used to retrain ML model 421 for maintained accuracy and performance.

This above described approach may ensure that appropriate weights are given to features (for example, a direction and/or magnitude) of a skew, anomalous, drift, and/or other different cluster so that synthesized data are similar in feature and count to that of the cluster. Thus, this approach may provide a meaningful approximation of synthetic data that is substantially similar (in other words, as close as possible) to the production data observed when quantities for retraining ML model 421 are not yet available.

FIGS. 5A-5D depict various example data plots corresponding to the processing of production data in an inference environment to identify data for use in retraining an ML model, as introduced above. More specifically, FIGS. 5A-5D correspond to example data plots generated from processing production data using an ML model trained to identify and classify images of digits 0 to 9 based on a Modified National Institute of Standards and Technology (MNIST) image data set, as shown in FIG. 6A. Variations in production data are introduced by injecting images data that are a variation of regular MNIST digit images, thereby simulating data drift or other data differences in production data as compared to training data, shown in FIG. 6B. The data plots of the FIGS. 5A-5D show how an AAE trained using the same MNIST image data set may be further used to identify changes in data (for example, one or more of the skew, anomalies, and/or drift introduced above) and retrain the ML model accordingly.

As an example, the trained AAE may employ a Keras Sequential model, an autoencoder (corresponding to an encoder and a decoder), and a discriminator. The encoder of the autoencoder may operate as a generator. As introduced, the AAE may be trained in a training environment using the MNIST image data set used to train the ML model, where the MNIST image data set comprises, for example, 60000 images with different counts of images of the digits 0 to 9. The AAE can then be deployed with a baseline (based on the training) in an inference environment. The production data for the trained AAE may comprise the MNIST image data for three digits, 0, 2, 3, and the injected images introduced above.

Figure 5A:
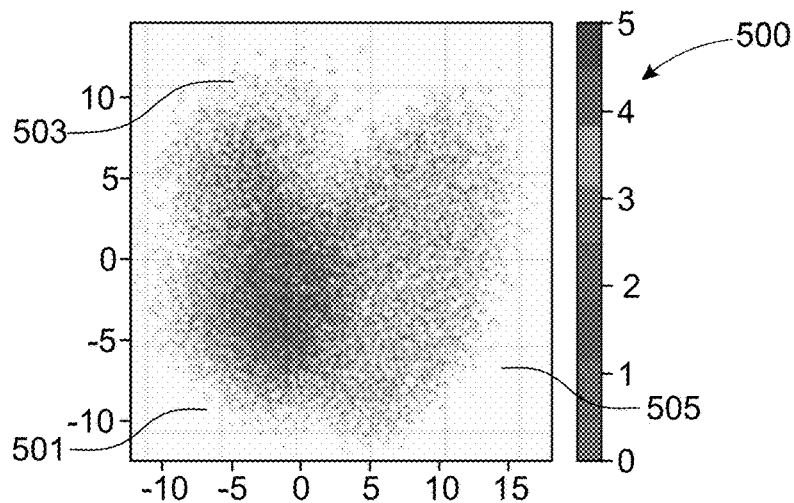
FIGS. 5A-5D depict various data plots corresponding to processing of production data in an inference environment to identify data for use in retraining an ML model, according to examples described in the present disclosure.
Figure 6A:
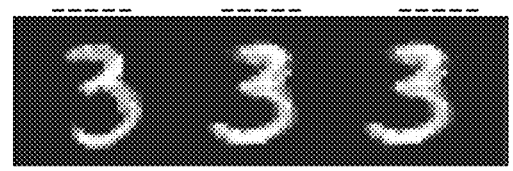
FIGS. 6A and 6B depict example MNIST digit images with drift and synthesized images for training an AAE, according to examples described in the present disclosure.

More specifically, FIG. 5A depicts a scatter plot 500 representing a latent space of production data (for example, the latent space 232 generated based on the production data 208) before introduction of any variations to the regular MNIST digit images. As shown, the scatter plot 500 indicates that three general types of data exist in the production data. The general types of data may correspond to different digits of the MNIST images introduced above. For example, a first portion 501 of the plot 500 may include a larger proportion of points corresponding to the digit '3' than other digits. Similarly, a second portion 503 of the plot 500 may include a larger portion of points corresponding to the digit '2' than other digits, while a third portion 505 of the plot 500 may include a larger portion of points corresponding to the digit '0' than other digits.

Figure 5B:
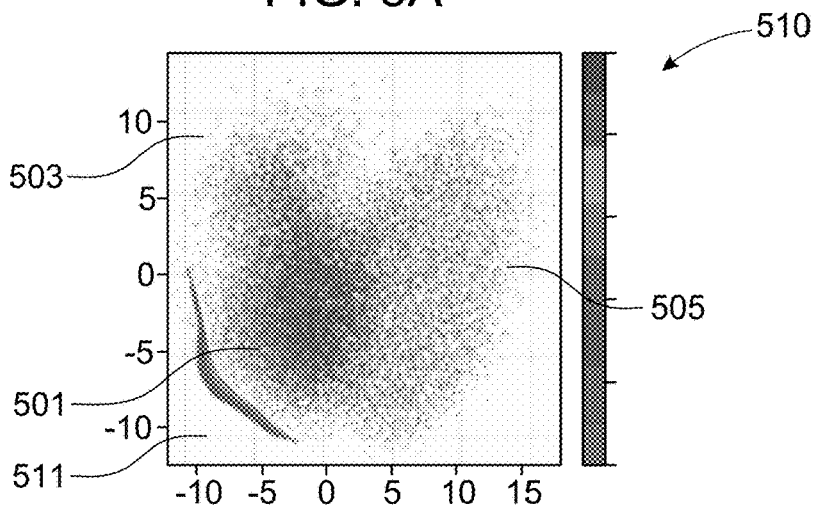

FIG. 5B depicts a scatter plot 510 representing the latent space of the production data and the digits '2', '3', and '0' of the scatter plot 500 with an additional representation of injected data that is different from the regular MNIST images used to train the ML model and the AAE. This additional representation may correspond to data drift and is depicted in the scatter plot 510 by region 511. Thus, the scatter plot 510 represents how the latent space can be used to identify images of production data that are different from the training data used to train the ML model and the AAE.

Figure 5C:
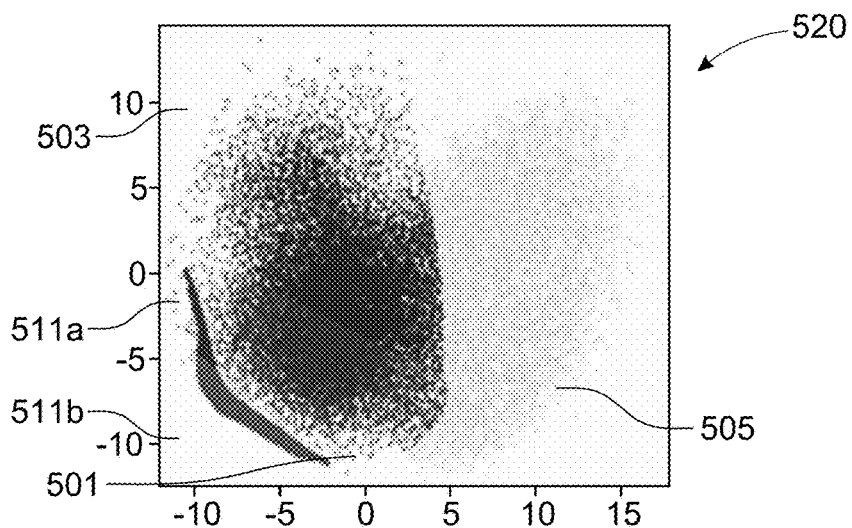

FIG. 5C depicts a scatter plot 520 representing a mixture model applied to the latent space data extracted from the production data. As shown, a first portion 511a of the region 511, corresponding to the different production data, is part of a cluster of portion 501 of the digit image '3', while a second portion of the region 511 is part of its own cluster 511b. A curve or contour of the cluster 511b may be processed using a data extrapolator of the training environment based on an extracted final latent space. In some examples, such processing may comprise (1) applying a density clustering mixture model to the extracted final latent space to recreate clusters and (2) estimating densities of the recreated clusters. A kernel density estimation plot can be generated based on applying the kernel density estimator to the recreated clusters. This may indicate a spread of high and low density spaces, which may correspond to high and low density changed data. A synthetic latent space can be created based on the density spread determined by the density estimator after weights are calculated and applied, as introduced above. This synthetic latent space can then be fed to the decoder of the AAE to generate synthetic images corresponding to the synthetic latent space. These recreated figures, along with the synthetic latent space, may correspond to the identified changed data of the production data. As such, the synthetic latent space, and the recreated figures, are synthetic versions of the newly identified changed data. These synthetic figures can then be used retrain the ML model.

Figure 5D:
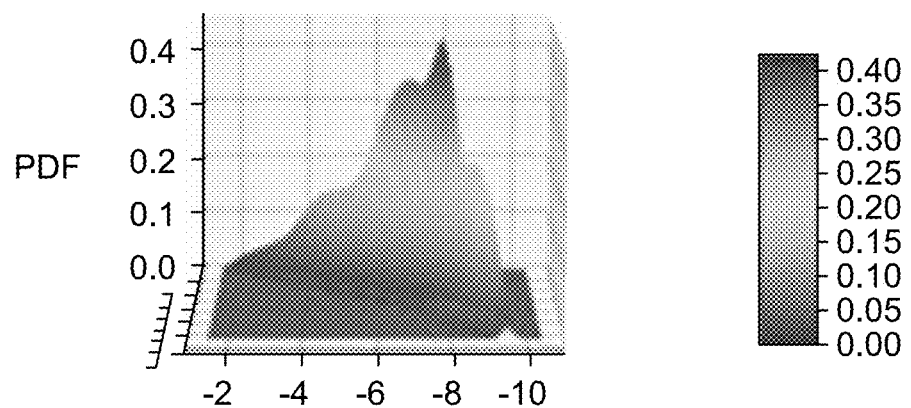

FIG. 5D depicts a plot 530 of densities of the cluster distribution of FIG. 5C, where clusters with a higher density have a higher peak in the plot 530.

Figure 6B:
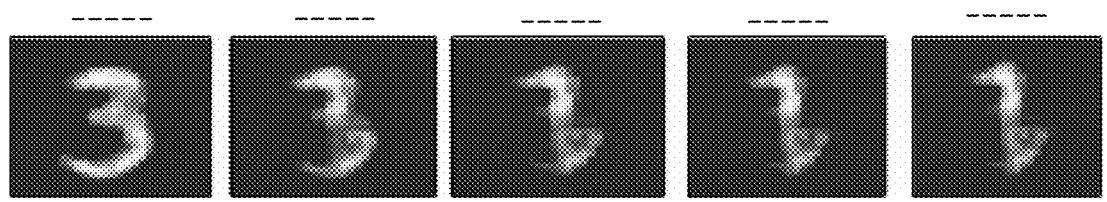

FIG. 6A shows how original images of the digit "3" may include drift, where the digit "3" is not completely clear and include artifacts, etc., which may be interpreted as drift. FIG. 6B shows how an AAE trained based on the images of FIG. 6A can generate synthetic images that are similar to the digit "3", which can be used to retrain an ML model to be able to identify changed data. Accordingly, the training and inference environments may successfully generate synthesized images resembling the digit "3" (akin to drifting data). These synthesized images may have weights to denser data, and may be further away from a "good" cluster representing known features. While the images shown are MNIST images, the systems and methods of the technology described herein may be applied pervasively to various other image or data types in various use cases, such as healthcare or smart manufacturing. In other words, the use of MNIST images/classifications in conjunction with FIGS. 5A-5D and 6A-6B is purely illustrative. Examples of the disclosed technology may utilize various types of images and classification techniques (including MNIST).

Figure 7:
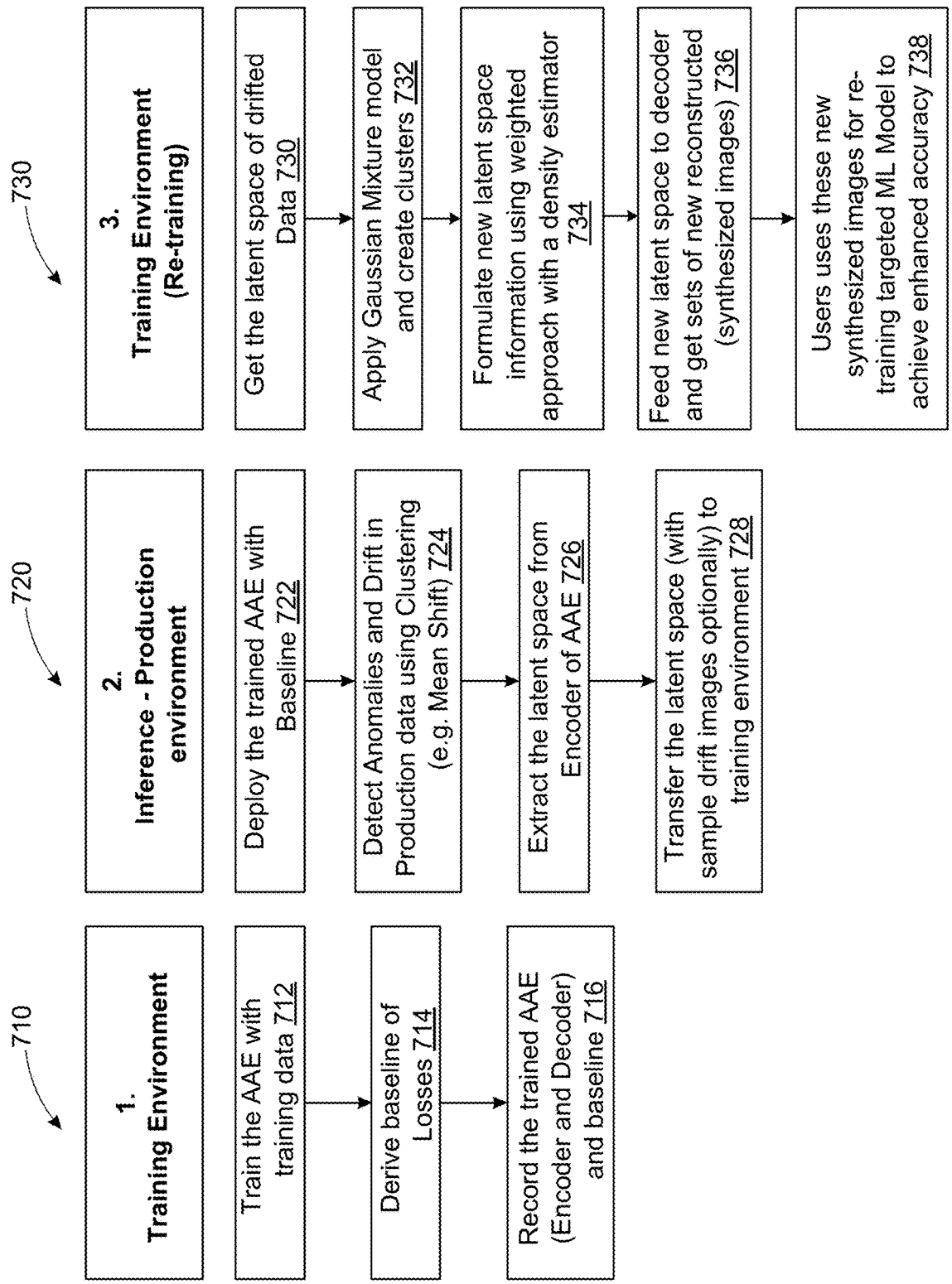
FIG. 7 depicts example flow diagrams which illustrate (1) training of an AAE and an ML model in a training environment, (2) applying the AAE and the ML model to production data in an inference environment, and (3) retraining the AAE and the ML model in the training environment, according to examples described in the present disclosure.

FIG. 7 depicts example flow diagrams which illustrate (1) training of an AAE and an ML model in a training environment, (2) applying the AAE and the ML model to production data in an inference environment, and (3) retraining the AAE and the ML model in the training environment, according to examples described in the present disclosure.

Flow diagram 710 provides an example flow of training an AAE, such as AAE 106. At operation 712, the AAE may be trained with training data, such as training data 102. The training, as described above with reference to FIG. 2, may comprise deriving a baseline of losses with the AAE at operation 714. The training may also comprise recording the trained AAE and baseline at operation 716 so that the trained AAE can be used to determine when the production data comprises data that is different from the training data. Such data differences may lead to retraining of the ML model.

Flow diagram 720 provides an example flow of applying the trained AAE to production data. At operation 722, the trained AAE is deployed in an inference environment with the stored baseline. As part of this deployment, the trained AAE is applied to the production data. At operation 724, the trained AAE detects changed data (e.g., anomalies, skew, and/or drift data) in the production data relative to the training data. In some examples, the trained AAE detects the changed data using one or more algorithms, such as a Mean Shift algorithm. The trained AAE may extract the latent space corresponding to the changed data at operation 726 and transfer the extracted latent space (optionally with sample drift images) to the training environment at operation 728.

The flow diagram 730 provides an example flow of analyzing the extracted and transferred latent space to determine a need to retrain the ML model. At operation 732, the transferred extracted latent space is received from the AAE at the inference environment. At operation 734, a density clustering mixture model, such as a Gaussian Mixture Model, is applied to the received latent space to recreate corresponding clusters. The extracted latent space and the corresponding densities are used to formulate new latent space information using a weighted approach and a density estimator at operation 736. At operation 738, the newly formulated latent space is fed to a decoder of the AAE to generate reconstructed synthesized images based on the newly formulated (i.e., synthetic) latent space. The reconstructed synthesized images may be used at operation 740 to retrain the ML model. In some examples, the reconstructed synthesized images may further be used to retrain the AAE.

Figure 8:
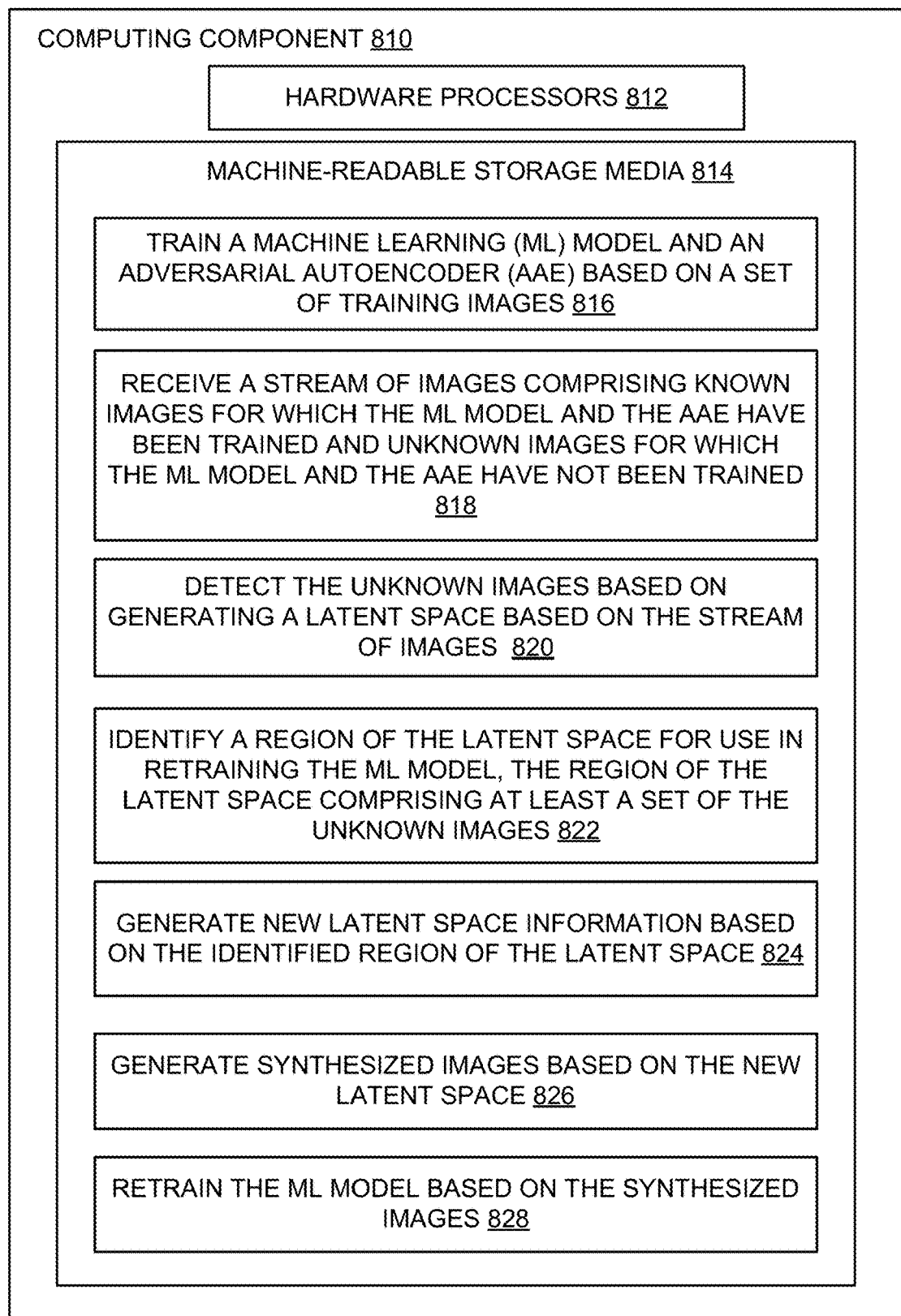
FIG. 8 depicts an example computing system that may be used to implement AAE training and application of the AAE to generate synthetic data to retrain an ML model, in accordance with various examples.

FIG. 8 depicts an example computing system 800 that may be used to implement AAE training and application of the AAE to generate synthetic data to retrain an ML model, in accordance with various examples. Referring now to FIG. 8, computing component 810 may be, for example, a server computer, a controller, or any other similar computing component capable of processing data. In the example implementation of FIG. 8, the computing component 810 includes a hardware processor 812, and machine-readable storage medium for 814.

Hardware processor 812 may be one or more central processing units (CPUs), semiconductor-based microprocessors, and/or other hardware devices suitable for retrieval and execution of instructions stored in machine-readable storage medium 814. Hardware processor 812 may fetch, decode, and execute instructions, such as instructions 816-828, to control processes or operations for burst preloading for available bandwidth estimation. As an alternative or in addition to retrieving and executing instructions, hardware processor 812 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 814, may be any electronic, magnetic, optical, or other physical storage device that contains or stores executable instructions. Thus, machine-readable storage medium 814 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 814 may be a non-transitory storage medium, where the term "non-transitory" does not encompass transitory propagating signals. As described in detail below, machine-readable storage medium 814 may be encoded with executable instructions, for example, instructions 816-828.

As described above, computing system 800 may be used to implement AAE training and application of the AAE to generate synthetic data to retrain an ML model. Accordingly, hardware processor 812 may execute instruction 816 to train a machine learning (ML) model, such as ML models 121, 221, 321, and/or 421, and an adversarial autoencoder (AAE), such as AAE 106, 206, 306, and/or 406, based on a set of training images, such as training data 102, 202, 302, and/or 402. In some examples, the training data may comprise training images. Training the AAE and the ML model via instruction 816 may correspond to training the ML model to generate one or more predictions with the training data and train the AAE to generate a baseline using the training data, as described above with respect to FIG. 2. As such, instruction 816 may cause hardware processor 812 to train the AAE to compare input data with the baseline to determine whether the input data matches the baseline, as described in further detail herein.

Hardware processor 812 may execute instruction 818 to receive a stream of images, such as production data 108, 208, 308, and/or 408, for processing by the ML model and the AAE. The stream of images may comprise images corresponding to, or similar to, images of the set of training images, as well as unknown images for which the ML model and the AAE have not been trained. In some examples, the unknown images may correspond to images comprising changed data, such as skew, anomalies, and/or drift, among other changed data. Execution of instruction 818 may comprise employing the AAE to process the stream of images.

Hardware processor 812 may execute instruction 820 to detect the unknown images in the stream of images based on generating a latent space, such as latent space 232, 332, and/or 432 for or based on the stream of images. As introduced above, the AAE may generate the latent space using an encoder of the AAE. The latent space may then be used to cluster or otherwise group data points of the latent space to identify changed data of the stream of images relative to the baseline for which the AAE was trained.

Hardware processor 812 may execute instruction 822 to identify a region of the latent space for use in retraining the ML model. The identified region of the latent space may comprise at least a set of the unknown images. The identified region of the latent space may correspond to the region of the latent space comprising the changed data, such as the region 511 that corresponds to drift data. As noted above, because the changed data may correspond to changes in the stream of images relative to the training data, the changed data, and thus the region 511, may correspond to the data that will be used to retrain the ML model.

Hardware processor 812 may execute instruction 824 to generate new latent space information based on the identified region of the latent space. In some examples, the new latent space may correspond to a synthesized latent space reconstructed based on, for example, density clustering using a mixture model and weights applied to and/or based on the cluster densities.

Hardware processor 812 may execute instruction 826 to generate synthesized images based on the new latent space. Hardware processor 812 may then execute instruction 828 to retrain the ML model and/or the AAE based on the synthesized images to enable further detection of changed data in a stream of images.

Figure 9:
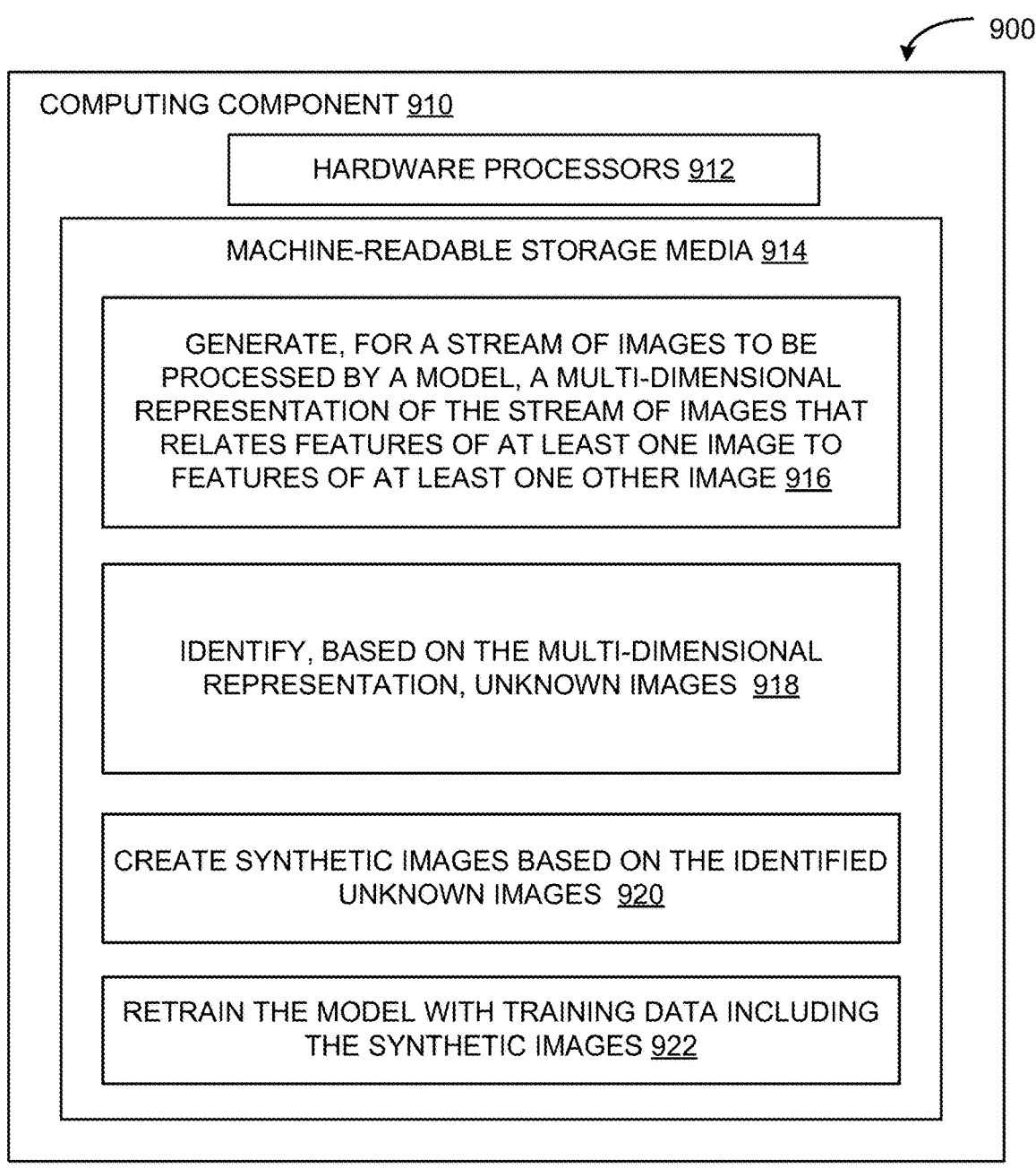
FIG. 9 depicts another example computing system that may be used to implement ML model training, in accordance with various examples.

FIG. 9 depicts an example computing system 900 that may be used to implement ML model training, in accordance with various examples. In various examples, computing system 900 may comprise an adversarial autoencoder (AAE) such as AAE 106, 206, 306, 406, etc. Referring now to FIG. 9, computing component 910 may be, for example, a server computer, a controller, or any other similar computing component capable of processing data. In the example implementation of FIG. 9, the computing component 910 includes a hardware processor 912, and machine-readable storage medium for 914.

Hardware processor 912 and machine-readable storage medium 914 may be the same/similar as hardware processor 812 and machine-readable storage medium 814 respectively. Accordingly, machine-readable storage medium 914 may be encoded with executable instructions, for example, instructions 916-922.

Hardware processor 912 may execute instruction 916 to generate, for a stream of images to be processed by a model, a multi-dimensional representation of the stream of images that relates features of at least one image of the stream of images to features of at least one other image of the stream of images. In certain examples, the multi-dimensional representation of the stream of images may comprise a latent space of the stream of images generated by an encoder of hardware processor 912, the encoder processing the stream of images. In some examples, the multi-dimensional representation may relate feature of each image of the stream of images to features of all the other images of the stream of images.

Hardware processor 912 may execute instruction 918 to identify, based on the multi-dimensional representation, unknown images. In certain examples, the unknown images may not fall into a cluster of known images. In various examples, such identification may comprise generating clusters on the multi-dimensional representation of the stream of images. This cluster generation may comprise generating clusters of known images that include threshold features of training images used to train the model and at least one cluster of the unknown images that do not include threshold features of the training images. The at least one cluster of unknown images may correspond to the unknown images. In certain examples, hardware processer 912 may provide a set of the unknown images to a user.

Hardware processor 912 may execute instruction 920 to create synthetic images based on the unknown images. In various examples, creation of the synthetic images may comprise (1) identifying cluster densities for the cluster of unknown images, (2) weighting the cluster densities in proportion to a density count of the cluster densities, and (3) generating the synthetic images based on the weighted cluster densities of unknown images.

Hardware processor 912 may execute instruction 922 to retrain the model with training data including the synthetic images.

In various examples, machine-readable storage media 914 may include further instructions (not pictured) which cause hardware processor 912 to apply a Gaussian Mixture model to the cluster of unknown images to recreate the cluster of the unknown images for further processing with respect to the cluster densities.

Figure 10:
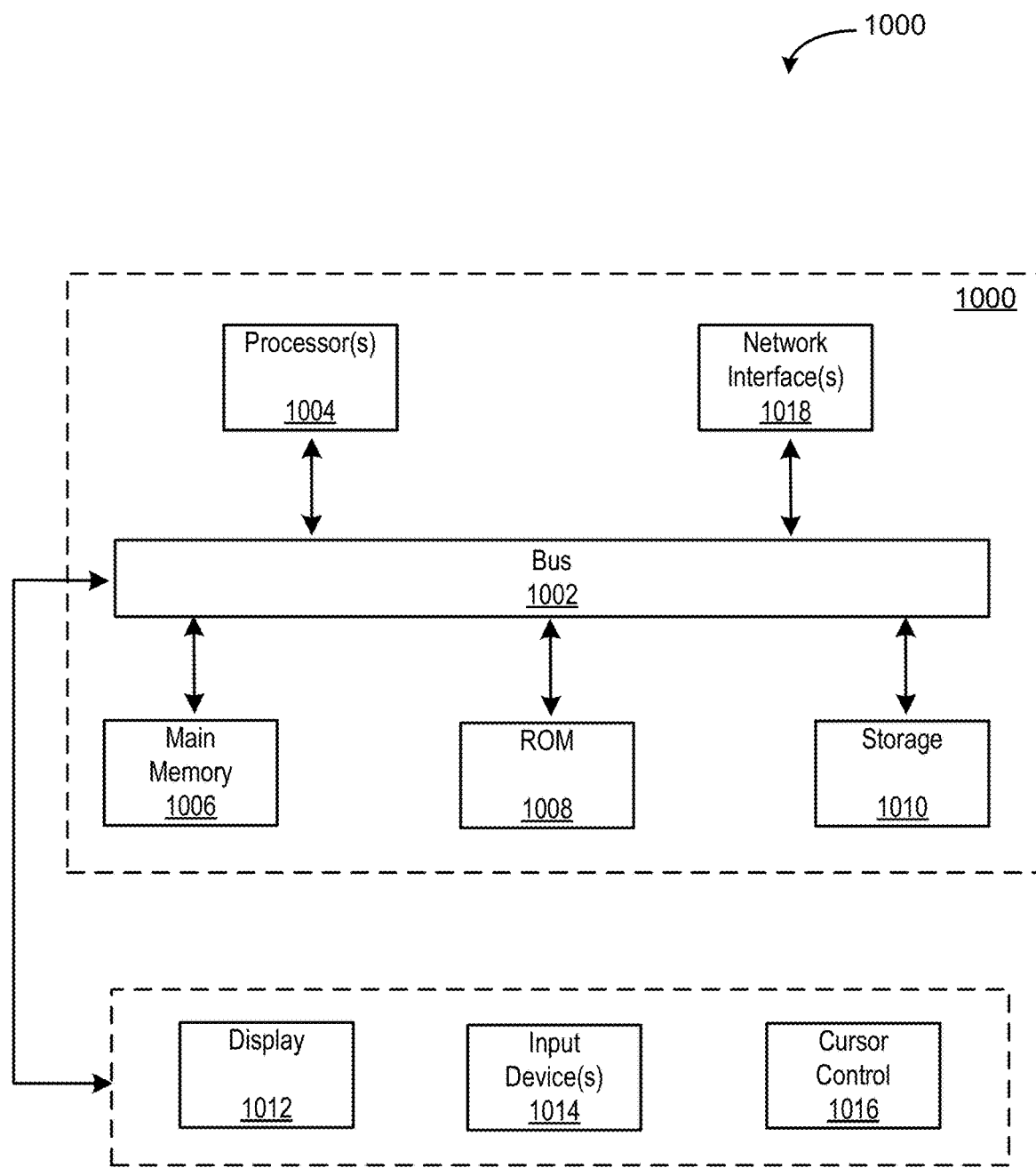
FIG. 10 depicts a block diagram of an example computer system in which various of the examples described herein may be implemented.

FIG. 10 depicts a block diagram of an example computer system 1000 in which various of the examples described herein may be implemented. The computer system 1000 includes a bus 1002 or other communication mechanism for communicating information, one or more hardware processors 1004 coupled with bus 1002 for processing information, such as the training and/or production data and corresponding data described herein. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004, such as instructions corresponding to the functional flow diagram 100 of FIG. 1, the functional flow diagram 200 of FIG. 2, the functional flow diagram 300 of FIG. 3, the functional flow diagram 400 of FIG. 4, the flow diagram 710, 720, and 730 of FIG. 7, and/or computing systems 800 and 900 of FIGS. 8 and 9 respectively, described above. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions. These instructions may correspond to instructions that implement one or more of the functional flow diagram 100, the functional flow diagram 200, the functional flow diagram 300, the functional flow diagram 400, the flow diagrams 710, 720, and/or 730, and/or computing systems 800 and 900 of FIGS. 8 and 9 respectively, described above The computer system 1000 further includes a read only memory (ROM) 1008 or other static storage device coupled to bus 1002 for storing static information and instructions for processor 1004, such as the instructions corresponding to the operation 700. A storage device 1010, such as a magnetic disk, optical disk, or USB thumb drive (Flash drive), etc., is provided and coupled to bus 1002 for storing information and instructions, such as the instructions corresponding to one or more of the functional flow diagram 100, the functional flow diagram 200, the functional flow diagram 300, the functional flow diagram 400, the flow diagrams 710, 720, and/or 730, and/or computing systems 800 and 900 of FIGS. 8 and 9 respectively, described above The computer system 1000 may be coupled via bus 1002 to a display 1012, such as a liquid crystal display (LCD) (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. In some examples, the same direction information and command selections as cursor control may be implemented via receiving touches on a touch screen without a cursor.

The computing system 1000 may include a user interface module to implement a GUI that may be stored in a mass storage device as executable software codes that are executed by a computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In some examples, the computing system 1000 may process one or more operations of one or more of the functional flow diagram 100, the functional flow diagram 200, the functional flow diagram 300, the functional flow diagram 400, the flow diagrams 710, 720, and/or 730, and/or computing systems 800 and 900 of FIGS. 8 and 9 respectively, and the like.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression, or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1000 may implement the techniques described herein using customized hard-wired logic, one or more ASICs or FPGAs, firmware and/or program logic which in combination with the computer system causes or programs computer system 1000 to be a special-purpose machine. According to one example, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

The computer system 1000 also includes a communication interface 1018 coupled to bus 1002. Network interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, network interface 1018 may be a local area network (LAN) card to provide a data communication connection to a compatible LAN (or WAN component to communicated with a WAN). Wireless links may also be implemented. In any such implementation, network interface 1018 sends and receives electrical, electromagnetic, or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the worldwide packet data communication network now commonly referred to as the "Internet." Local network and Internet both use electrical, electromagnetic, or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network(s), network link and communication interface 1018. In the Internet example, a server might transmit a requested code for an application program through the Internet, the ISP, the local network, and the communication interface 1018.

The received code may be executed by processor 1004 as it is received, and/or stored in storage device 1010, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various aspects and processes described above may be used independently of one another or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and aspects described can be shared in part or in total among one or more circuits. Even though various aspects or elements of functionality may be individually described or claimed as separate circuits, these aspects and functionality can be shared among one or more common circuits, and such description shall not require or imply that separate circuits are required to implement such aspects or functionality. Where a circuit is implemented in whole or in part using software, such software can be implemented to operate with a computing or processing system capable of carrying out the functionality described with respect thereto, such as computer system 1000.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain aspects, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system, comprising:
   a processor; and
   a memory configured to store instructions that, when executed by the processor, cause the processor to:
   generate, for a stream of images to be processed by a model, a multi-dimensional representation of the stream of images that relates features of at least one image of the stream of images to features of at least one other image of the stream of images;
   identify, based on the multi-dimensional representation, unknown images;
   generate clusters of known images and at least one cluster of the unknown images based on the multi-dimensional representation of the stream of images, wherein the at least one cluster of unknown images corresponds to the unknown images;
   create synthetic images based on the identified unknown images, wherein creating the synthetic images comprises:
   identifying cluster densities for the cluster of unknown images;
   weighting the cluster densities in proportion to a density count of the cluster densities; and
   generating the synthetic images based on the weighted cluster densities of unknown images; and
   retrain the model with training data including the synthetic images.

2. The system of claim 1, wherein the multi-dimensional representation of the stream of images comprises a latent space of the stream of images generated by an encoder of the processor, the encoder processing the stream of images.

3. The system of claim 1,
   the clusters of known images include threshold features of training images used to train the model, and
   the at least one cluster of unknown images do not include the threshold features of the training images.

4. The system of claim 1, wherein the instructions further cause the processor to apply a Gaussian Mixture model to the at least one cluster of unknown images to recreate the at least one cluster of unknown images for further processing with respect to the cluster densities.

5. The system of claim 1, wherein the instructions further cause the processor to provide a set of unknown images to a user.

6. A method, comprising:
   training a machine learning (ML) model and an adversarial autoencoder (AAE) based on a set of training images;
   receiving a stream of images for processing by the ML model and the AAE, the stream of images comprising images corresponding to images of the set of training images and unknown images for which the ML model and the AAE have not been trained;
   detecting the unknown images based on generating a latent space based on the stream of images, wherein detecting the unknown images comprises generating clusters of known images and at least one cluster of unknown images based on the latent space, wherein the at least one cluster of unknown images corresponds to the unknown images;
   identifying a region of the latent space for use in retraining the ML model, the region of the latent space comprising at least a set of the unknown images;
   generating new latent space information based on the identified region of the latent space;
   generating synthesized images based on the new latent space generating new latent space information based on the identified region of the latent space comprises:
   identifying cluster densities for the at least one cluster of unknown images; and
   weighting the cluster densities in proportion to a density count of the cluster densities, wherein the synthesized images are generated based on the weighted cluster densities of unknown images; and
   retraining the ML model based on the synthesized images.

7. The method of claim 6, wherein the latent space is generated by an encoder of the AAE, the encoder processing the stream of images.

8. The method of claim 6, wherein:
   the clusters of known images include threshold features of training images used to train the ML model, and the at least one cluster of unknown images do not include the threshold features of the training images.

9. The method of claim 6, wherein generating new latent space information based on the identified region of the latent space further comprises applying a Gaussian Mixture model to the at least one cluster of unknown images to recreate the at least one cluster of unknown images for further processing with respect to the cluster densities.

10. The method of claim 8, further comprising reconstructing a set of unknown images from the stream of images using a decoder of the AAE.

11. The method of claim 10, further comprising providing the reconstructed set of unknown images to a user.

12. A non-transitory computer-readable storage medium including instructions that, when executed by at least one processor, cause the processor to perform a method comprising:
   training an AAE with a baseline based on a set of training data;
   receiving a stream of data for processing by a trained ML model, the stream of data comprising data corresponding to the set of training data and unknown data for which the ML model and the AAE have not been trained;
   identifying the unknown data in the stream of data based on processing the data in the stream of data, wherein identifying the unknown data comprises generating clusters of data corresponding to the set of training data and at least one cluster of unknown data, wherein the at least one cluster of unknown data corresponds to the unknown data;
   generating synthesized data based on the unknown data in the stream of data, wherein generating the synthesized data comprises:
   identifying cluster densities for the at least one cluster of unknown data; and
   weighting the cluster densities in proportion to a density count of the cluster densities, wherein the synthesized data is further generated based on the weighted cluster densities of unknown data; and
   retraining the ML model and the AAE based on the synthesized data.

13. The non-transitory computer-readable storage medium of claim 12, including further instructions which cause the processor to perform a method further comprising:

detecting the unknown data based on generating a latent space based on the stream of data;

identifying a region of the latent space for use in retraining the ML model, the region of the latent space comprising at least a set of the unknown data; and generating new latent space information based on the identified region of the latent space, wherein the synthesized data is generated based on the new latent space information.

14. The non-transitory computer-readable storage medium of claim 13, wherein the latent space is generated by an encoder of the AAE processing the stream of data.

15. The non-transitory computer-readable storage medium of claim 13, wherein generating the clusters of data corresponding to the set of training data and the at least one cluster of unknown data is based on the latent space, and wherein the clusters of known data include threshold features of training data used to train the AAE and the at least one cluster of unknown data do not include the threshold features of the training data.

16. The non-transitory computer-readable storage medium of claim 15, wherein generating new latent space information based on the identified region of the latent space is based on the identifying of the cluster densities of unknown data, and the weighting of the cluster densities.

17. The non-transitory computer-readable storage medium of claim 16, wherein generating new latent space information based on the identified region of the latent space further comprises applying a Gaussian Mixture model to the at least one cluster of unknown data to recreate the at least one cluster of unknown data for further processing with respect to the cluster densities.

18. The non-transitory computer-readable storage medium of claim 12, including further instructions which cause the processor to perform a method further comprising:

reconstructing a set of unknown data from the stream of data using a decoder of the AAE; and providing the reconstructed set of unknown data to a user.

19. The system of claim 1, wherein the instructions further cause the processor to:

reconstruct a set of unknown images from the stream of images using a decoder; and providing the reconstructed set of unknown images to a user.

20. The system of claim 19, further comprising:

an adversarial autoencoder (AAE) that includes the decoder.

* * * * *